Sept. 14, 1965   T. H. HOLMES ETAL   3,205,970
ACOUSTICAL WELL LOGGING TOOL
Filed Dec. 29, 1958
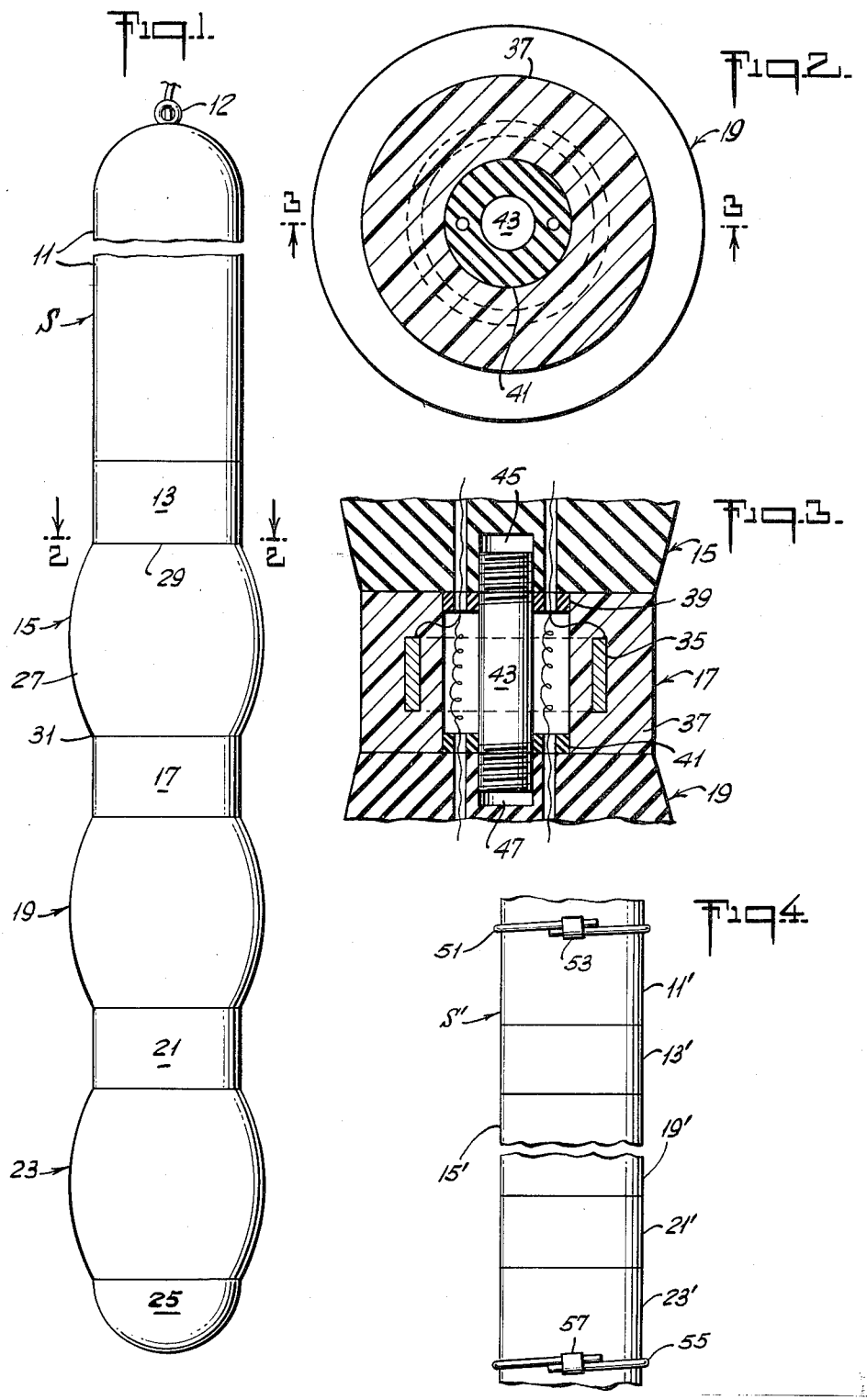

United States Patent Office 3,205,970
Patented Sept. 14, 1965

3,205,970
ACOUSTICAL WELL LOGGING TOOL
Thomas H. Holmes and Oswald A. Itria, Bellaire, Tex., assignors to Texaco Inc., a corporation of Delaware
Filed Dec. 29, 1958, Ser. No. 783,440
8 Claims. (Cl. 181—.5)

The present invention relates to a novel acoustical well logging tool which can be operated in a bore hole in the earth without complications from the frictional noise generated by previous tools as the result of scraping against the side walls of the hole.

Acoustical well logging systems and tools are described in many prior art patents such as 2,704,364 and 2,722,282. In general these tools comprise a long thin sonde having a single supersonic transmitting transducer, and one or two supersonic receiving transducers spaced longitudinally from the transmitting transducer and from one another. The transducers ordinarily are spaced from one another by spacer members of material characterized by poor sound conductivity to reduce transmission of sound from the transmitting transducer through the tool itself to the receiving transducers.

The transducers ordinarily are piezo electric crystals, such as barium titanate, which may be embedded within a matrix of a synthetic resin, such as polymethyl methacrylate (Lucite). In the past the long thin sonde has had a substantially constant diameter throughout its length, and sometimes is coated with a layer of rubber.

It has been found that while acoustically logging a hole with the sondes known previously, the periphery of the sonde over its whole length scrapes against the side walls of the hole. When the areas adjacent to the receiving transducers scrape a friction noise is generated in the transducers and transmitted to the recording apparatus, distorting the log and making difficult its interpretation and correlation with formations within the hole. Such friction noises develop even when the sonde is coated with a material such as rubber.

In accordance with the present invention an acoustical well logging tool comprises a long thin sonde, axially aligned supersonic transmitting and receiving transducers spaced from one another longitudinally along the sonde, and means for spacing each receiving transducer from physical contact with the wall of the hole being logged to prevent generation of frictional noise in each receiving transducer. The spacing means extends laterally from the sonde beyond the periphery of each receiving transducer, and may have any suitable shape to accomplish this purpose while at the same time permitting the sonde to pass freely through the mud in a borehole. A preferred shape is one wherein a spacer member is tapered in two directions from a central area of greatest circumference, to both ends having the least circumference which is about the same as the adjoining transducer. This construction in effect streamlines the spacer members so that they can travel up and down through the mud in the hole without hindrance and without permitting mud to accumulate on the tool.

The invention will be described more in detail with reference to the accompanying drawings; wherein FIG. 1 is a side elevational view of a sonde having the preferred construction;

FIG. 2 is a cross-sectional view taken along the line 2—2 of FIG. 1;

FIG. 3 is a vertical sectional view taken along the line 3—3 in FIG. 2; and

FIG. 4 is a fragmentary side elevational view of a sonde embodying a modification of the invention.

Referring to FIG. 1, sonde S comprises a metal shaft 11 having an eye 12 at the top to receive a cable for lowering the sonde into a hole and withdrawing it therefrom. On the lower end of shaft 11 there is secured a supersonic transmitting transducer 13, and below this in series are a tapered spacer member 15, a first receiving transducer 17, a second spacer member 19, a second receiving transducer 21, a third tapered spacer member 23, and a metal bull plug 25.

Each of the spacer members 15, 19 and 23 is constructed of a non-metallic material such as rubber having poor acoustical conductivity, and shaped somewhat like a barrel. Referring to spacer member 15 for illustration, it has a central circumferential area 27 of greatest diameter and circumference from which it tapers in both directions to its ends 29 and 31 of a smaller diameter and circumference about the same as that of the adjoining transducers. Consequently, when the sonde S is drawn upwardly or sinks downwardly within a hole, the only peripheral contact is between the protruding area 27 and the wall of the hole, thus avoiding the generation of friction noises within the receiving transducers 17 and 21.

Referring to FIGS. 2 and 3, which represent the construction of all three transducers and their manner of connection to the adjoining sonde members, it will be seen that the receiving transducer 17 comprises a tubular cylindrical piezo electric crystal 35 concentrically embedded within a matrix 37 of a synthetic resin also having a tubular cylindrical shape. The matrix 37 is concentrically mounted by a pair of cylindrical upper and lower rubber washers 39 and 41 on a metal spindle 43 having both ends projecting beyond the matrix and threaded into bores 45 and 47 in rubber spacer members 15 and 19. Suitable longitudinal passages are provided through the spacer members 15 and 19 and the washers 39 and 41 for the passage of wires leading from the piezo electric crystal in the various transducers.

Referring to FIG. 4 there is shown a modification of the invention wherein the top and bottom transducers 13', 21' and any others, as well as the shaft 11' and spacer members 15', 19' and 23' and any others, all have about the same diameter so that ordinarily friction noise would be generated while logging a hole. In accordance with this aspect of the invention, friction noise is eliminated by securing lengths of bare or insulated cable 51 and 55 around shaft 11' at the top of the acoustic section, and around spacer member 23' at the bottom of the acoustic section so as to touch the wall of a hole during passage of the sonde, thus holding the transducer elements at all times in spaced relationship to the wall. Similar rings may be mounted on intermediate spacer members. The cables may be secured in any desired way, as by clamps 53 and 57 or by taping them in place. Also, while a ring shaped bare cable is shown, other types of rings could be applied such as a shaped metal bar or a rubber insulated cable.

In tests which were conducted under comparable conditions with a conventional sonde having the same diameter for all transducers and spacer members, and with sondes modified in accordance with the invention, it was found that the present invention very effectively overcomes the problem of friction noise signals. For example, three runs were made in the same borehole with three sonde arrangements.

Run No. 1 was made using a conventional logging sonde of uniform diameter, and the resulting velocity log contained friction noise signals to a degree which made the log of questionable value.

Run No. 2 was made using a conventional logging sonde of uniform diameter and having a 1/16 inch thick rubber covering on the outside of the transducers. The resulting velocity log was as undesirable as run No. 1, showing that rubber covered acoustical elements do not solve the problem of noise.

Run No. 3 was made using the modification of the present invention illustrated in FIG. 4 using a ⅜ inch diameter cable wrapped and taped around the spacer members of the sonde to maintain the acoustical elements free from the borehole wall. Two such guards were employed one at each end of the acoustic section. The resulting record was completely free of friction noise signals.

In another hole velocity logs were operated using the arrangements of both FIGS. 1 and 4 in adjacent boreholes. The resulting logs were completely free of friction noise signals. Moreover it was found that the sonde of FIG. 1 having tapered streamlined spacer members allowed better passage through the borehole without build-up of mud on the sonde.

From the foregoing description it is evident that the present inventors have successfully solved an annoying problem in the art of acoustical well logging by eliminating friction noise as a factor having a detrimental effect.

Obviously many modifications and variations of the invention as hereinbefore set forth may be made without departing from the spirit and scope thereof and only such limitations should be imposed as are indicated in the appended claims.

We claim:

1. An acoustical well logging tool comprising an elongated tubular sonde including a supersonic transmitting transducer and at least a first supersonic receiving transducer spaced from and aligned axially with said transmitting transducer; said receiving transducer having an effective outer periphery of substantially the same dimension as the outer tubular portion of said sonde in the vicinity thereof, a first spacer member axially aligned with said transducers and physically connecting said transmitting and first receiving transducers together, said first member having a substantially greater diameter than said receiving transducer and having a non-metallic peripheral region formed of resilient material such that said receiving transducer is spaced from physical contact with the wall of a hole being logged to prevent generation of friction noise in said receiving transducer.

2. An acoustical well logging tool in accordance with claim 1, also comprising a second similar spacer member secured to and axially aligned with said receiving transducer on the side thereof remote from said first spacer member.

3. An acoustical well logging tool in accordance with claim 1, also comprising a second receiving transducer spaced from and axially aligned with said first named receiving transducer, and a second spacer member axially aligned with said transducers and physically connecting said two receiving transducers together, said second member having a substantially greater diameter than said receiving transducers such that both of said receiving transducers are prevented from physically contacting the wall of such hole.

4. An acoustical well logging tool in accordance with claim 3, also comprising a third similar spacer member secured to and axially aligned with said second receiving transducer on the side thereof remote from said second spacer member.

5. An acoustical well logging tool in accordance with claim 1 wherein said first spacer member is formed of a non-metallic material characterized by a low acoustical velocity, and is tapered in two directions from a central area of greatest circumference to both ends having the least circumference about the same as the adjoining transducer.

6. An acoustical well logging tool comprising a supersonic transmitting transducer and two supersonic receiving transducers, all of cylindrical shape and arranged in longitudinally spaced and axially aligned relationship to one another; spacer members of non-metallic material having poor acoustical conductivity located between each pair of adjacent transducers, and having end surfaces abutting against said transducers, each of said transducers having an outside diameter substantially corresponding to the outer diameter of said portions of said tool other than said spacer members, each of said spacer members having a central outside circumference greater than the outside circumference of said transducers and tapering in two directions from said central outside circumference to the ends thereof, said ends having the same outside circumference as the adjoining transducers whereby said spacer members have a streamlined shape permitting easy passage of said tool through drilling mud in a hole; and a plurality of connecting members severally passing through said transducers and secured to the adjoining spacer members for holding said transducers and said spacer members firmly in axially aligned position.

7. An acoustical well logging tool in accordance with claim 6 wherein said transducers are all hollow cylindrical members having an internal diameter greater than the internal diameter of said connecting members, each of said transducers also comprising a pair of non-metallic washers located in the space between said connecter member and said hollow cylindrical member adjacent the opposite ends of said transducer for spacing said transducer from said connecting member to assist in preventing sound transmission through said tool.

8. In an acoustical well logging system comprising an elongated instrument of generally tubular cross-section suitable to be passed through a borehole for conducting an acoustical well log of earth formations along the borehole, said instrument including a supersonic transmitting transducer for emitting supersonic acoustic energy in the borehole and at least one generally tubular receiving transducer spaced from the transmitting transducer along the principal axis of the instrument for receiving acoustic energy transmitted from the transmitting transducer, the outer circumference of said receiving transducer being of substantially the same dimension as the outer dimension of the elongated logging instrument, the improvement wherein the instrument includes spacing members formed of non-metallic material having relatively poor acoustical conductivity positioned on the opposite sides of said receiving transducer along said principal axis, said spacing members having an outer circumference significantly greater than the outer circumference of said receiving transducer whereby said spacing members are effective to prevent scraping contact of the receiving transducer against the walls of the borehole as the instrument is moved in the borehole.

References Cited by the Examiner

UNITED STATES PATENTS

| | | | |
|---|---|---|---|
| 2,156,052 | 4/39 | Cooper | 181—.5 |
| 2,233,992 | 3/41 | Wyckoff | 181—.5 |
| 2,350,371 | 6/44 | Smith | 181—.5 |
| 2,651,027 | 9/53 | Vogel | 181—.5 |
| 2,694,461 | 11/54 | Martin | 181—.5 |
| 2,708,485 | 5/55 | Vogel. | |
| 2,722,282 | 11/55 | McDonald | 181—.5 |
| 2,794,512 | 6/57 | Martin | 181—.5 |

SAMUEL FEINBERG, *Primary Examiner.*

CHESTER L. JUSTUS, LAURENCE V. EFNER, CARL W. ROBINSON, ISAAC LISANN, *Examiners.*